(12) United States Patent
Arimura (10) Patent No.: US 8,083,017 B2
(45) Date of Patent: Dec. 27, 2011

(54) MOTORCYCLE

(75) Inventor: Masatsugu Arimura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 187 days.

(21) Appl. No.: 12/047,187

(22) Filed: Mar. 12, 2008

(65) Prior Publication Data

US 2008/0223643 A1 Sep. 18, 2008

(30) Foreign Application Priority Data

Mar. 13, 2007 (JP) ................................. 2007-064199

(51) Int. Cl.
*B62K 11/00* (2006.01)

(52) U.S. Cl. .................. 180/219; 180/229; 180/68.1

(58) Field of Classification Search .................. 180/219, 180/229, 68.1, 68.2
See application file for complete search history.

(56) References Cited

U.S. PATENT DOCUMENTS

| | | | | |
|---|---|---|---|---|
| 4,478,306 A * | 10/1984 | Tagami | ........................... | 180/229 |
| 4,564,081 A * | 1/1986 | Hamane et al. | ............... | 180/229 |
| 4,632,206 A * | 12/1986 | Morinaka et al. | ............. | 180/229 |
| 4,633,965 A * | 1/1987 | Tsurumi et al. | ............... | 180/229 |
| 4,776,422 A * | 10/1988 | Sakuma | ......................... | 180/219 |
| 4,818,012 A * | 4/1989 | Kohama et al. | ............... | 296/78.1 |
| 4,830,135 A * | 5/1989 | Yamashita | .................... | 180/229 |
| 4,911,494 A * | 3/1990 | Imai et al. | ..................... | 296/78.1 |
| 5,330,029 A * | 7/1994 | Yoshimura et al. | ........... | 180/219 |
| 5,490,573 A * | 2/1996 | Hagiwara et al. | ............. | 180/68.1 |
| 5,715,904 A * | 2/1998 | Takahashi et al. | ............. | 180/229 |
| 6,105,701 A * | 8/2000 | Buell | ............................ | 180/229 |
| 6,851,499 B2 * | 2/2005 | Yagisawa et al. | ............. | 180/219 |
| 6,889,789 B2 * | 5/2005 | Kurayoshi et al. | ............ | 180/219 |
| 7,284,632 B2 * | 10/2007 | Ito et al. | ........................ | 180/229 |
| 7,510,229 B2 * | 3/2009 | Katagiri et al. | ............... | 296/78.1 |
| 7,556,115 B2 * | 7/2009 | Iwanaga | ........................ | 180/229 |
| 7,686,116 B2 * | 3/2010 | Oohashi et al. | ............... | 180/219 |
| 2006/0040145 A1* | 2/2006 | Tokumura et al. | .............. | 429/12 |
| 2007/0066210 A1* | 3/2007 | Ueda et al. | ..................... | 454/125 |
| 2007/0089923 A1* | 4/2007 | Oohashi et al. | ............... | 180/229 |
| 2007/0144802 A1* | 6/2007 | Tsuya | ............................ | 180/68.2 |
| 2007/0151789 A1* | 7/2007 | Bracy et al. | .................... | 180/219 |

FOREIGN PATENT DOCUMENTS

JP 04-262065 9/1992

* cited by examiner

*Primary Examiner* — Anne Marie Boehler
*Assistant Examiner* — Maurice Williams
(74) *Attorney, Agent, or Firm* — Keating & Bennett, LLP (57) ABSTRACT

A motorcycle that discharges air that has passed through a radiator such that the air does not directly impinge on a rider, thereby resolving discomfort. An air guide passage guides air that has passed through the radiator so that the air passes through a gap between a front side cover and a fuel tank to a portion higher than the fuel tank.

8 Claims, 14 Drawing Sheets

MOTORCYCLE

RELATED APPLICATIONS

This application claims the benefit of priority under 35 USC 119 of Japanese patent application no. 2007-064199, filed on Mar. 13, 2007, which application is hereby incorporated by reference in its entirety.

BACKGROUND OF THE INVENTION

1. Field of the Invention

This invention relates to a motorcycle having a radiator situated forward of an engine, a fuel tank situated above the engine, and a cover covering side portions of the fuel tank and the radiator to thereby guide running wind to the radiator.

2. Description of Related Art

In typical motorcycles, a radiator is provided above a front portion of an engine mounted in a body frame, and a side cover for inducing running wind to the radiator is sometimes provided at a side of the radiator.

In JP-A-Hei 4-262065, for example, running wind is induced through a gap between left and right side covers to a radiator. Air having passed through the radiator is discharged rearward from exhaust ports defined at positions rearward of the radiator in the side covers.

Thus, in this motorcycle, air having passed through the radiator and having a relatively high temperature is discharged rearward out of the exhaust ports in the side covers. This structure is disadvantageous because the air flowing out of the side covers has a relatively high temperature and directly impinges on feet of a rider, which can cause the rider to experience discomfort, particularly in summer.

SUMMARY OF THE INVENTION

The present invention addresses these circumstances and provides a motorcycle that discharges high temperature air that has passed through a radiator without directly impinging on a rider, thereby eliminating or reducing rider discomfort.

The present invention provides a motorcycle having a body frame, an engine mounted on the body frame, a radiator situated forward of the engine, a fuel tank situated above the engine, and a cover covering side portions of the fuel tank and radiator. An air guide passage situated between the cover and the fuel tank guides air that has passed through the radiator to an area higher than the fuel tank.

According to the motorcycle of the invention, because the air guide passage defined between the cover and the fuel tank guides air that has passed through the radiator to the area higher than the fuel tank, the air flows rearward through an area higher than a foot of a rider. High temperature is thereby prevented from directly impinging on the foot of the rider, thereby preventing or suppressing rider discomfort.

Furthermore, because a large quantity of running wind flows through the area higher than the fuel tank, high temperature air guided to this area is diluted with a large quantity of running wind to substantially the same temperature as that of the running wind, and the rider is further protected from experiencing discomfort.

Other features and advantages of the invention will be apparent from the following detailed description, taken in conjunction with the accompanying drawings that illustrate, by way of example, various features of embodiments of the invention.

DETAILED DESCRIPTION OF THE INVENTION

An embodiment of the present invention is now described with reference to the drawings. FIGS. 1-14 illustrate a motorcycle 1 according to an embodiment of the invention. The terms front and rear, and left and right in the following description are from the perspective of a seated rider unless otherwise specified.

Motorcycle 1 is an off-road motorcycle that includes an engine 3 mounted in a cradle of a body frame 2. A radiator 60 is situated forward of and above engine 3. A fuel tank 8 is mounted in body frame 2 at a position above engine 3. Left and right front side covers 61, 62 cover left and right side walls 8f and left and right sides of radiator 60.

A seat 9 is mounted in frame 2 at a position rearward of fuel tank 8. A front fork 5 is supported by a head pipe 4 situated on a front end of body frame 2 to be steered to the left and right. A rear arm 6 is vertically pivotally supported by a bottom rear end of body frame 2. A rear wheel suspension 7 is interposed between rear arm 6 and body frame 2.

A front wheel 10 is pivotally supported in a lower end of front fork 5. Steering handlebars 11 are fixed to an upper end of front fork 5. A rear wheel 12 is pivotally supported in a rear end of rear arm 6. A front fender 63 is attached to front fork 5 at a position above front wheel 10. A headlight 64 is provided on the front of head pipe 4 at a position forward of front fork 5. Protectors 65 protect sliding portions of front fork 5 from flying gravel, splashed water and the like.

Body frame 2 includes left and right main frames 13 and left and right down tubes 14. Main frames 13, extend rearward on a vehicle center line from a rear end of head pipe 4 and then extend obliquely downward to the rear, and are increasingly spaced from each other in the vehicle width direction. Down tubes 14 are positioned below main frames 13 and extend rearward to the bottom from head pipe 4 and then extend generally horizontally at the bottom toward the rear to be connected with bottom rear ends of main frames 13. Engine 3 is accommodated in a space surrounded by left and right main frames 13 and left and right down tubes 14.

Body frame 2 also includes left and right seat rails 15 for supporting seat 9 extending obliquely upward to the rear from main frames 13, and left and right seat stays 16 connecting rear ends of seat rails 15 and bottom rear ends of main frames 13.

Engine 3 is a water-cooled 4-cycle single cylinder engine mounted with its cylinder axis extending generally vertically. Engine 3 is constructed by stacking a cylinder block 3b, a cylinder head 3c and a head cover 3d on a crank case 3a to form a unit. Rotational output of engine 3 is transmitted to a rear-wheel sprocket 12a of rear wheel 12 via a chain 19.

Fuel tank 8 is mounted on main frames 13 and has a two-part structure constructed of upper and lower parts by joining an upper tank 8d and a lower tank 8c. Upper tank 8d and lower tank 8c are joined together by welding flanges 8e formed on tanks 8d and 8c to each other. A fuel cap 8b is reclosably mounted on an upper wall of upper tank 8d. A rear side of fuel cap 8b is covered with seat 9.

Front side covers 61, 62 are resin injection-molded parts and function as an air scoop for inducing running wind into radiator 60 therethrough, and also as an exterior component for improving appearance. Front side covers 61, 62 include upper covers 61a, 62a, which have a wing shape, and lower covers 61b, 62b, which have a generally V-shape. Upper covers 61a, 62a extend in a fore-and-aft direction to cover upper portions of side walls 8f of fuel tank 8 and radiator 60. Lower covers 61b, 62b extend downward from bottom front edges of upper covers 61a, 62a to cover a lower portion of radiator 60.

Upper cover 61a and lower cover 61b of left front side cover 61 are formed into a unit. Meanwhile, right front side cover 62 is formed in a two-piece structure, in which upper (first) cover 62a and lower (second) cover 62b are formed separately.

As viewed from above the vehicle, front side covers 61, 62 have widened portions 61c, 62c projecting outward in the vehicle width direction from a front end portion of fuel tank 8. As viewed from a side of the vehicle, widened portions 61c, 62c cover a lower portion of head pipe 4 and extend to a position at which widened portions 61c, 62c partially overlap front fork 5.

Radiator 60 is provided on a right outer (one) side of body frame 2 in the vehicle width direction. An on-vehicle component unit 67 is provided on a left (the other) side; i.e., on a side opposite to radiator 60 with body frame 2 therebetween in the vehicle width direction. More specifically, radiator 60 is provided in a space surrounded by head pipe 4, right main frame 13 and widened portion 62c of right front side cover 62. On-vehicle component unit 67 is positioned in a space surrounded by head pipe 4, left main frame 13, and widened portion 61c of left front side cover 61.

On-vehicle component unit 67 is constructed by unitizing a U-shaped support member 68 formed by bending a steel pipe inward in the vehicle width direction, support brackets 69a-69e each made of a metal sheet and connected to support member 68, and on-vehicle components 70a-70e detachably attached to support brackets 69a-69e.

Support member 68 has an upper side 68c, a lower side 68d and a longitudinal side 68e connecting between upper and lower sides 68c and 68d. Inner ends of upper side 68c and lower side 68d are attached to left main frame 13 with mounting brackets 68a, 68b therebetween.

On-vehicle components 70a-70e include a fuse box 70a attached to support bracket 69a on upper side 68c, a recovery tank 70b attached to support bracket 69b on upper side 68c and support bracket 69c on longitudinal side 68e for supplying cooling water to radiator 60, a regulator 70c attached to support bracket 69d on longitudinal side 68e, a secondary-air cut valve 70d attached to support bracket 69c, and a horn 70e attached to support bracket 69e on lower side 68d.

An inner cover 71 is provided in front of support member 68. Inner cover 71 is detachably attached to support brackets 69b, 69c at upper and lower bosses 71a, 71b of inner cover 71. A cylindrical document holder 73 for receiving an operating manual and the like therein is detachably attached to a rear face of inner cover 71 with a rubber band 74.

Inner cover 71 is formed to substantially stop up a gap between widened portion 61c of left front side cover 61 and a left side face of main frame 13, and covers on-vehicle components 70a-70d from their front sides. Only horn 70e is downwardly exposed to the outside out of inner cover 71.

Figure 1:
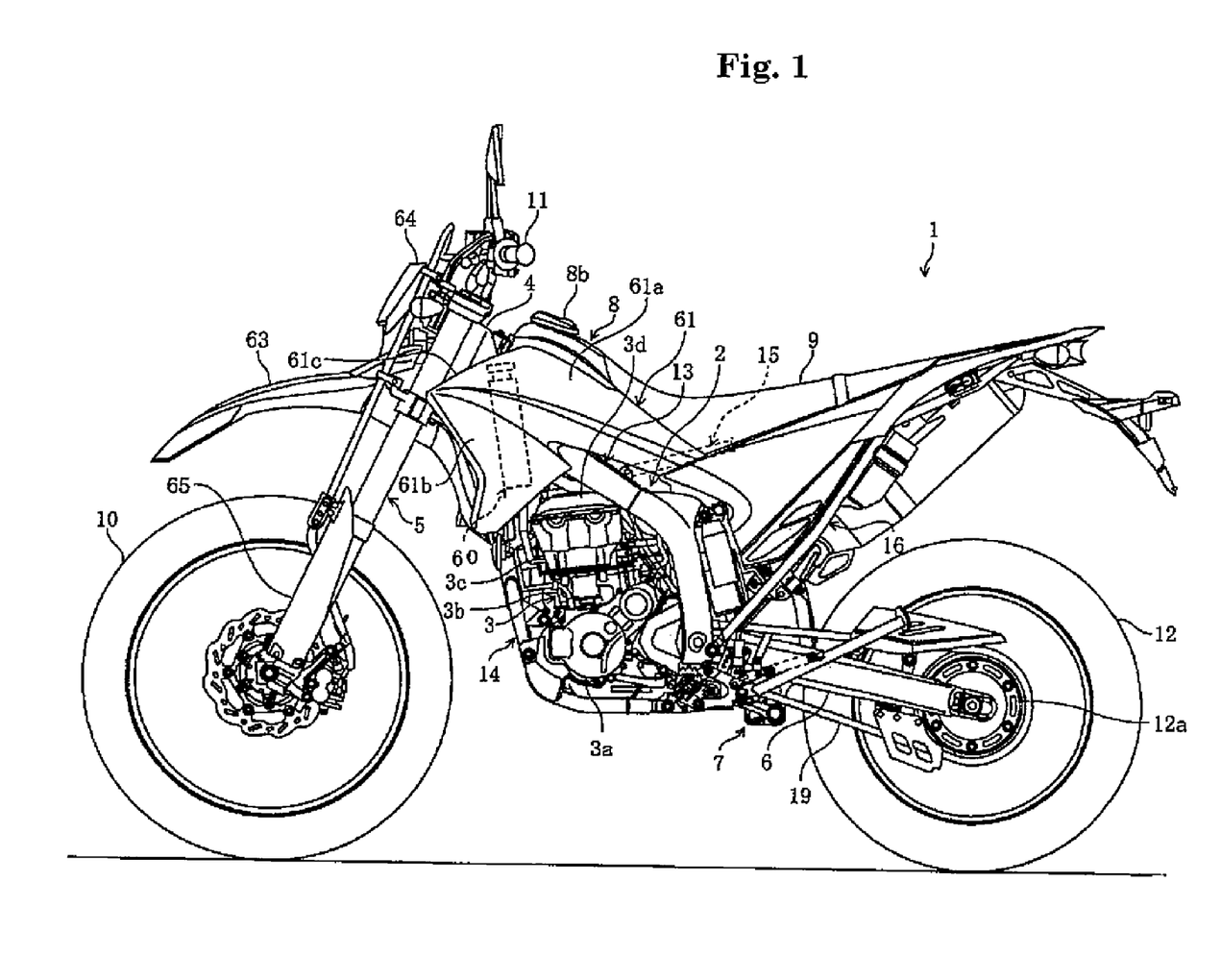
FIG. 1 is a side view of a motorcycle according to an embodiment of the present invention.
Figure 2:
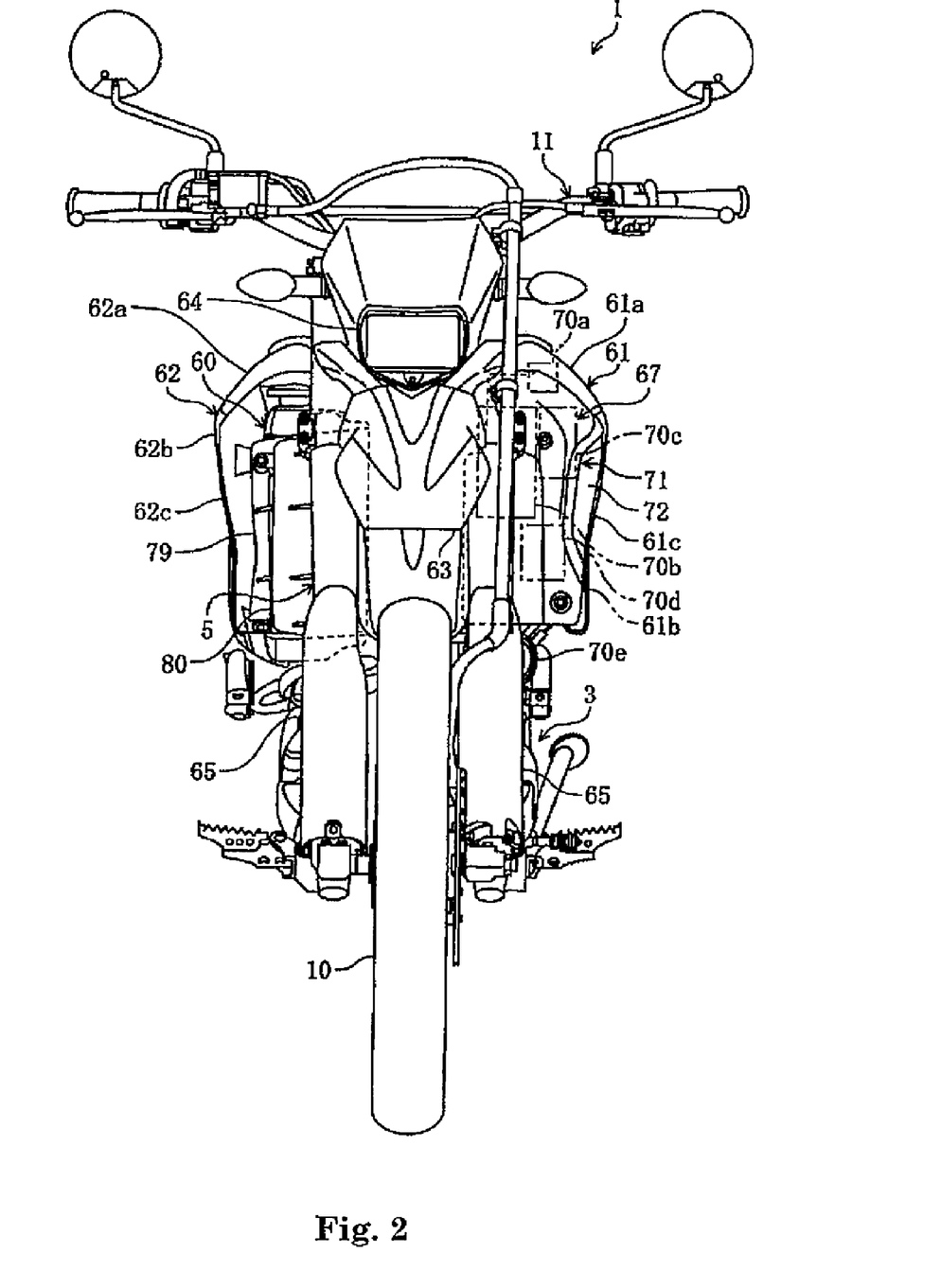
FIG. 2 is a front view of the motorcycle.
Figure 3:
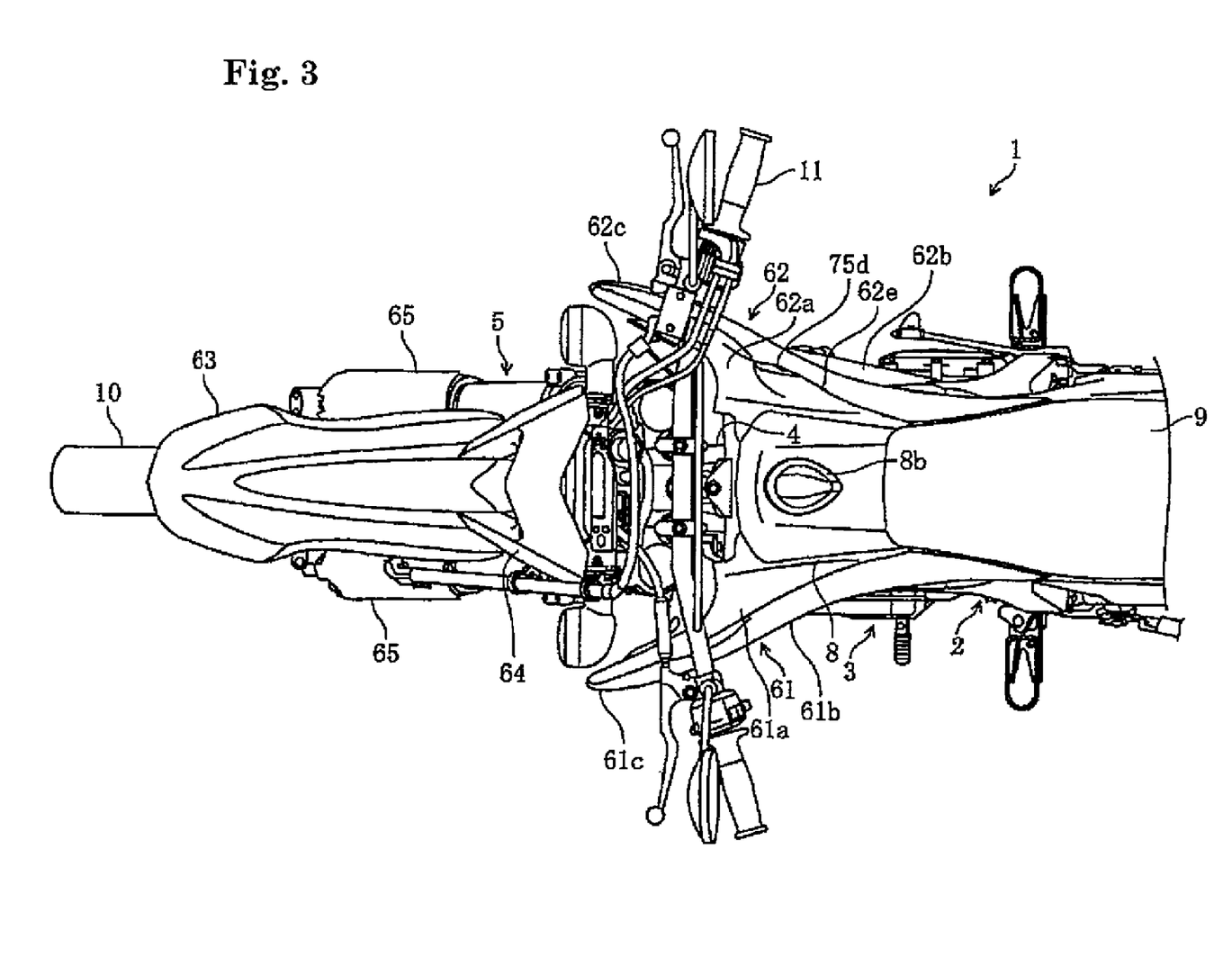
FIG. 3 is a plan view of the motorcycle.
Figure 4:
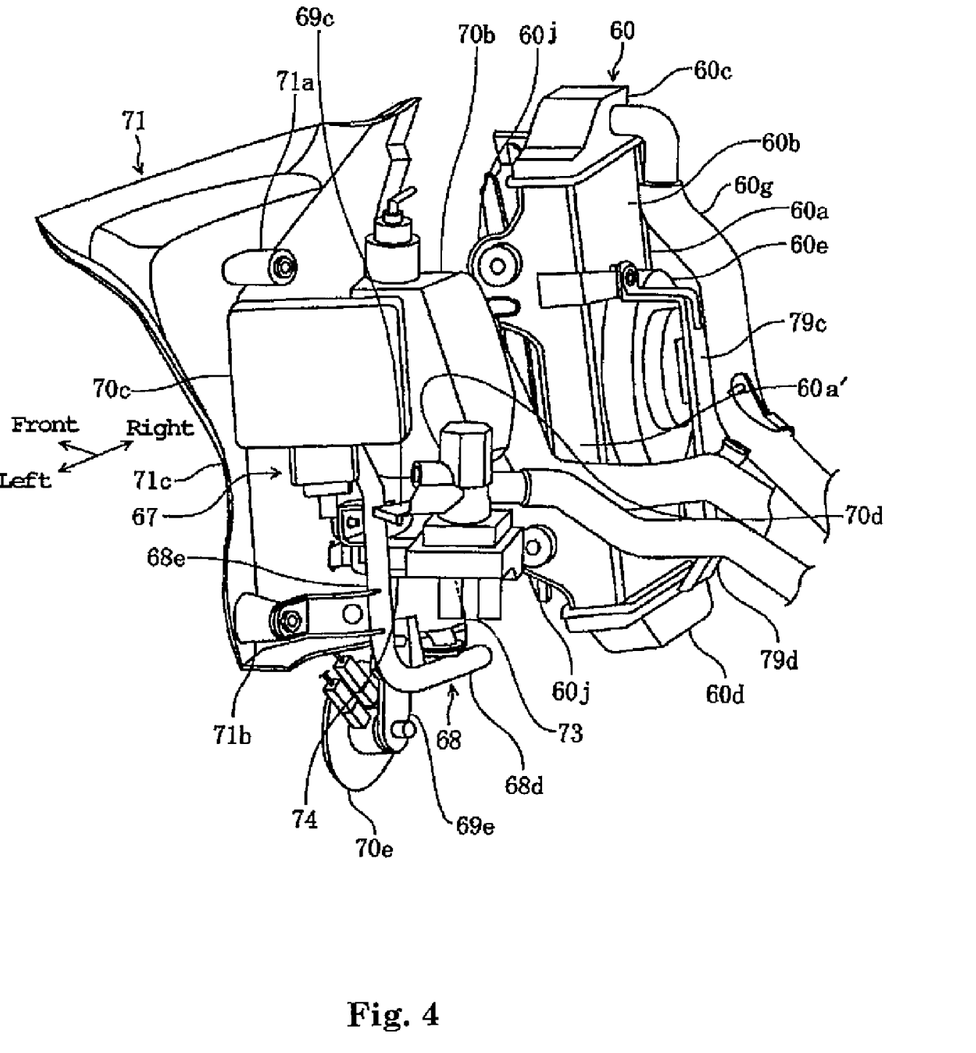
FIG. 4 is a perspective view of a radiator and on-vehicle component unit mounted on the motorcycle as viewed from an obliquely rearward position.
Figure 5:
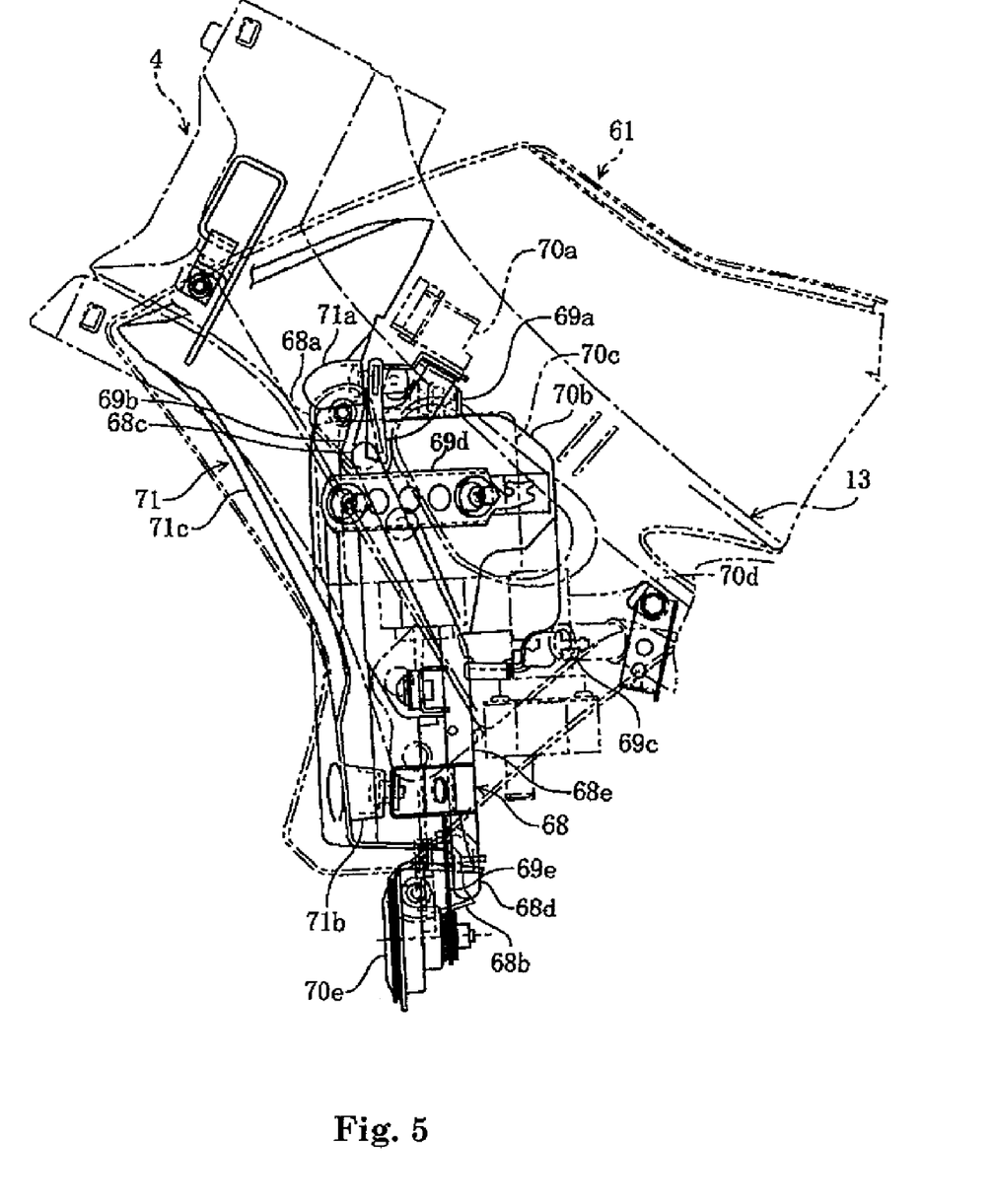
FIG. 5 is a side view of the on-vehicle component unit.
Figure 6:
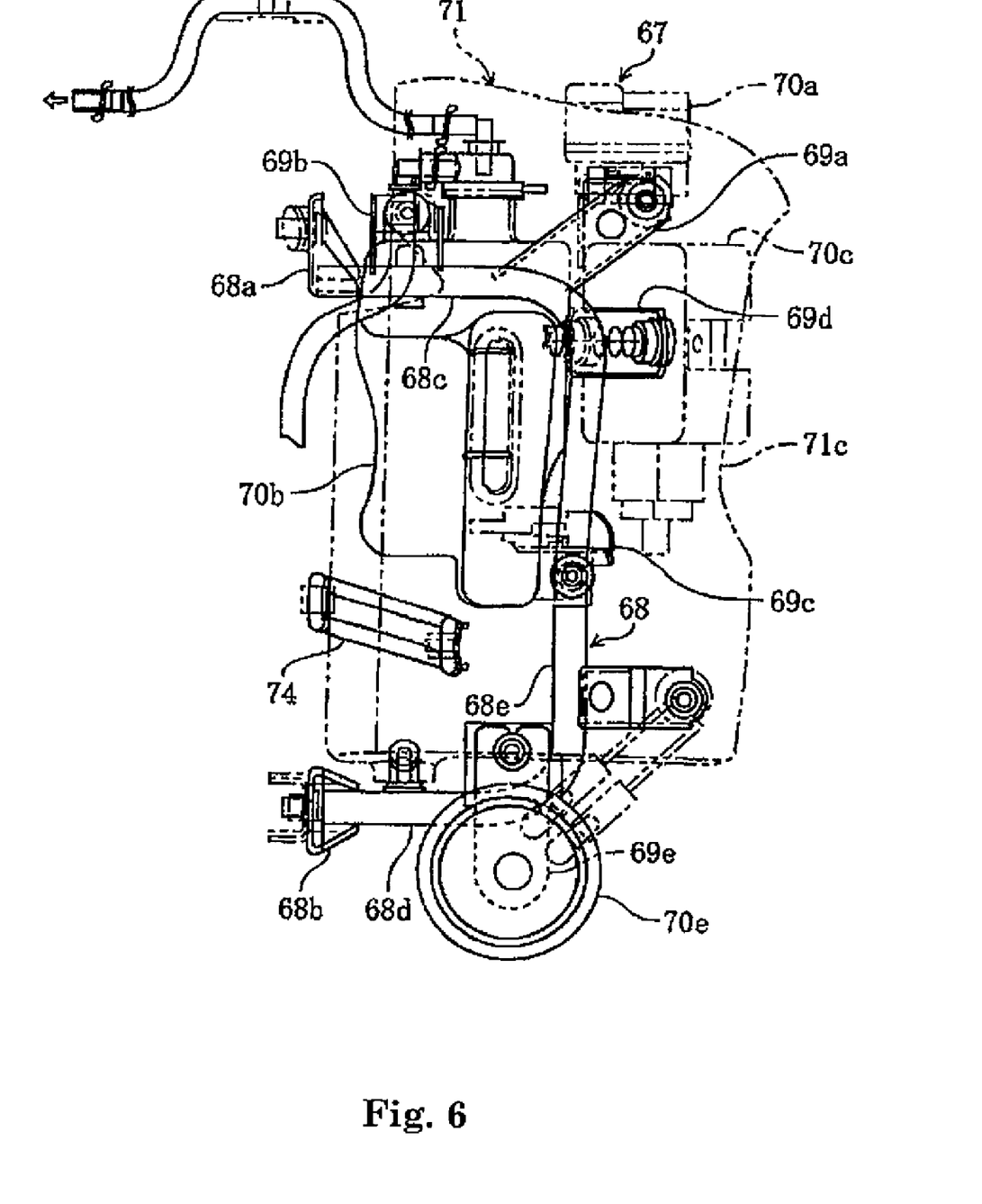
FIG. 6 is a front view of the on-vehicle component unit.

A notch 71c is formed in an outer edge of inner cover 71. A vertically-extending running wind inlet 72 is defined by notch 71c and widened portion 61c (FIG. 2). Running wind that enters through running wind ventilating port 72 flows rearward without directly impinging on on-vehicle components 70a-70d. Simultaneously, air flow secondarily produced by the rearward flow cools on-vehicle components 70a-70d.

Radiator 60 includes a core 60b supported by a rectangular frame 60a, top and bottom tanks 60c, 60d provided on upper and lower faces of frame 60a, respectively, and communicating with core 60b, and an electric fan 60e situated rearward of core 60b. A radiator cap 60f is removably mounted on top tank 60c.

Upper and lower mounting portions 60j bulge frontward from an inner frame 60a' of frame 60a. Upper and lower mounting portions 60j are detachably attached to main frame 13.

A supplying hose 60g, through which cooling water that has cooled engine 3 and therefore has risen in temperature is supplied, is joined to top tank 60c. A cooling water hose 60h, through which cooling water that has been cooled by core 60b is returned to engine 3, is connected to bottom tank 60d. Cooling water hose 60h is connected to a cooling-water pump 3i driven by engine 3 to supply cooling water from cooling water pump 3i to water jackets in engine 3 (see FIG. 10).

Motorcycle 1 includes an air guide passage 75 and a running wind intake passage 76 that is provided independently of air guide passage 75. Running wind "a" that has entered from the front of the vehicle passes through radiator 60 and is increased in temperature is referred to herein as air "a'." Air guide passage 75 guides air "a'" to flow through a gap between right front side cover 62 and fuel tank 8 to an area higher than fuel tank 8. Running wind intake passage 76 guides running wind "b" that has entered from the front of the vehicle to flow through a gap between radiator 60 and right front cover 62 to the rear of the vehicle. The structures of passages 75, 76 are described below in detail.

A guide 78 for guiding running wind "a" to core 60b in radiator 60 is provided on a front face 60i of radiator 60. Guide 78 is detachably attached to frame 60a of radiator 60. Guide 78 includes vertically-extending, strip-shaped first to fourth guide plates 79-82 juxtaposed in the vehicle width direction and connecting plates 83 that connect guide plates 79-82 to one another in the vehicle width direction. Connecting plates 83 are juxtaposed at predetermined vertical intervals.

Guide plates 79-82 tilt toward right front side cover 62 relative to front face 60i of radiator 60. Accordingly, as viewed from the front of the vehicle, guide plates 79-82 cover core 60b in radiator 60, thereby preventing foreign bodies from directly intruding into core 60b.

Figure 13:
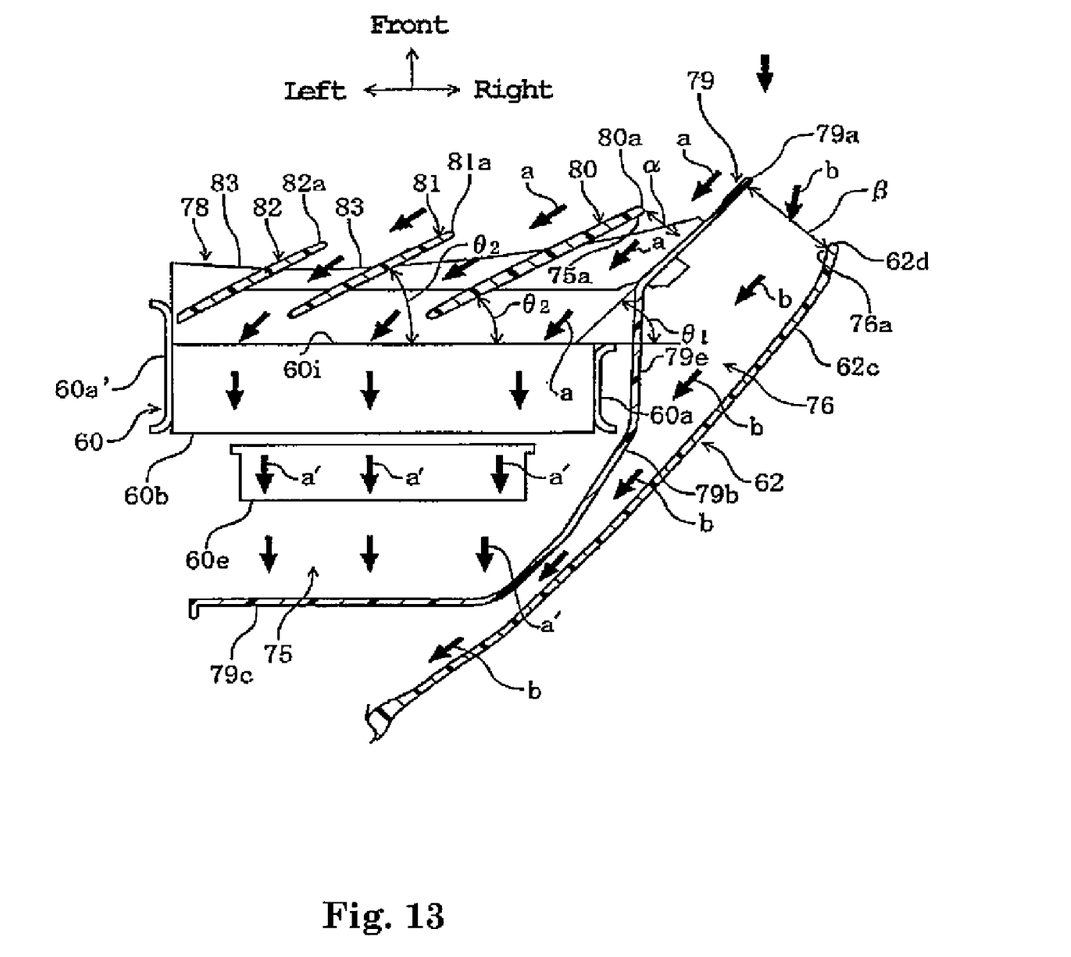
FIG. 13 is a cross-sectional view taken along line XIII-XIII of FIG. 12, showing flows of running wind around the radiator.
Figure 14:
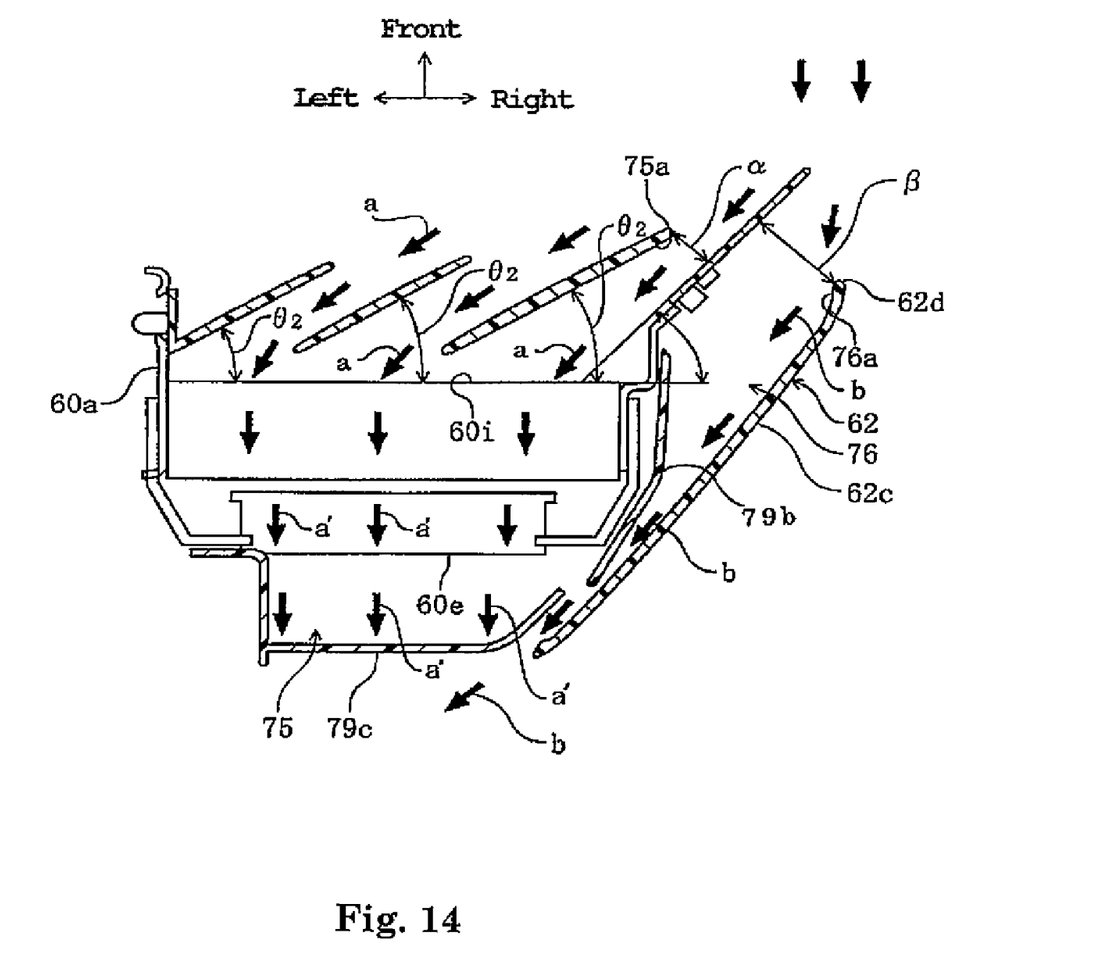
FIG. 14 is a cross-sectional view taken along line XIV-XIV of FIG. 12, showing flows of running wind around the radiator.

An angle θ1 between first (outermost) guide plate 79, which is the outermost of guide plates 79-82 and is closest to right front side cover 62, and front face 60i of radiator 60 is set to be greater than an angle θ2 between each of guide plates 80-82 and front face 60i of radiator 60 (FIGS. 13 and 14). More specifically, whereas angle θ1 formed by first guide plate 79 is approximately 45°, angle θ2 formed by guide plates 80-82 is approximately 30°.

A front edge 62d of right front side cover 62 extends frontward to a position forward of front face 60i of radiator 60. A front edge 79a of first guide plate 79 extends frontward to a position farther forward than front edge 62d of right front side cover 62.

Front edges 80a-82a of guide plates 80-82 are situated rearward of front edge 79a of first guide plate 79, and arranged such that the closer the guide plates are to the inside, the more the front edges of the guide plates deviate rearward.

Front edge 79a of first guide plate 79 and front edge 62d of right front side cover 62 define a vertically-elongated air inlet 76a of air intake passage 76. An opening width 6 of air inlet 76a is set to be greater than an opening width CL of a running wind inlet 75a defined by first guide plate 79 and second guide plate 80.

Figure 7:
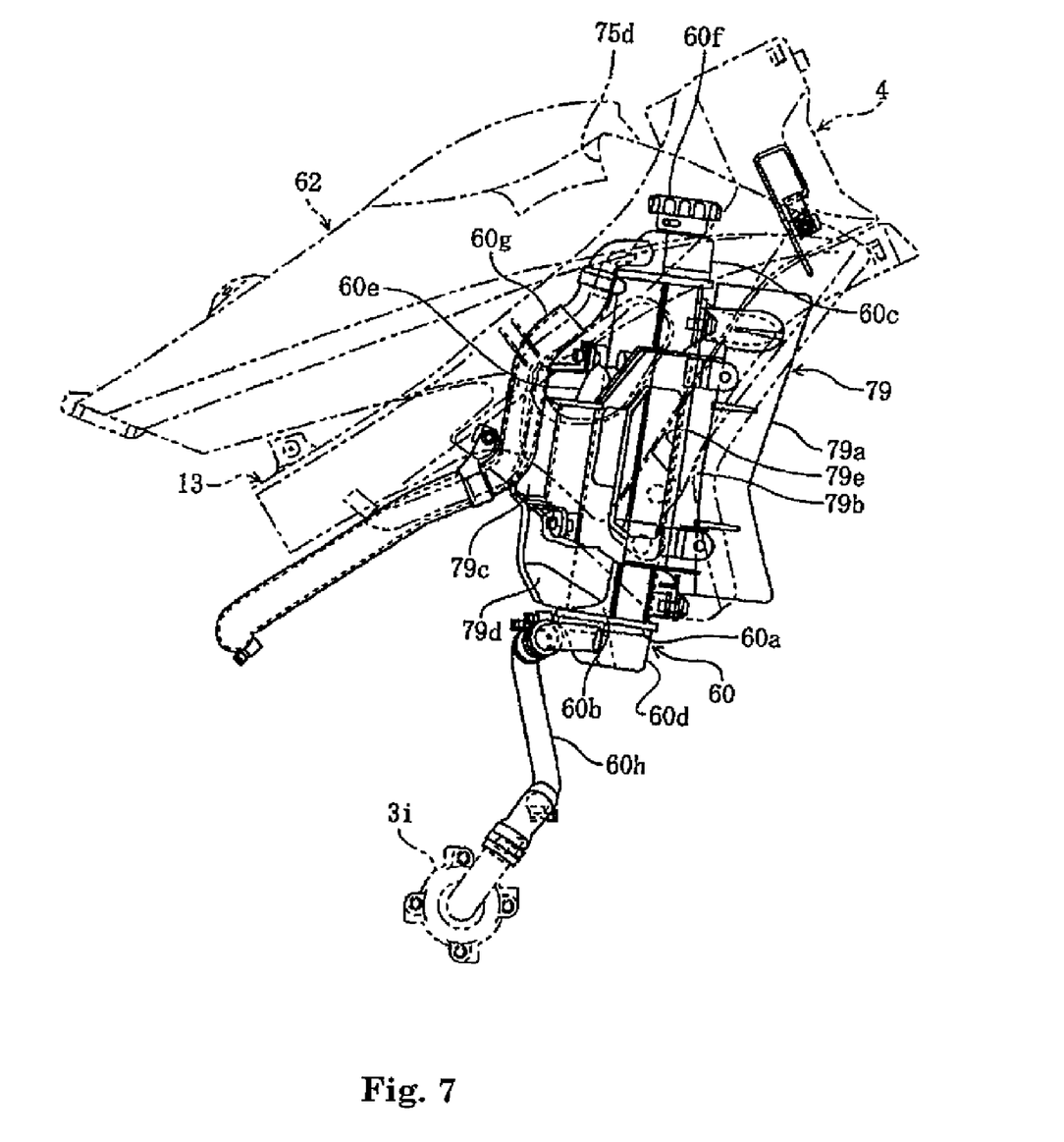
FIG. 7 is a side view of the radiator.
Figure 8:
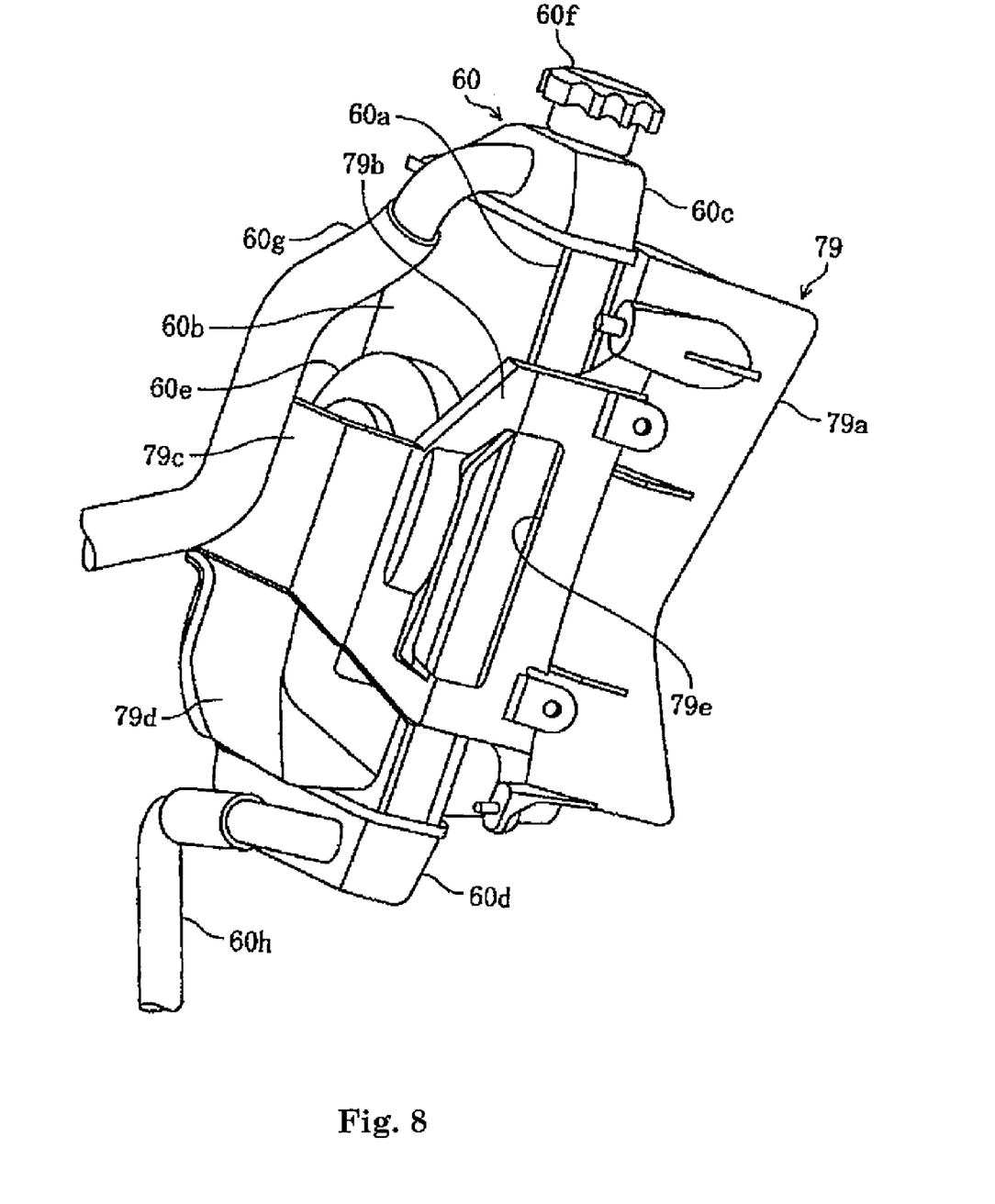
FIG. 8 is a perspective view of the radiator as viewed from an obliquely rearward position.
Figure 9:
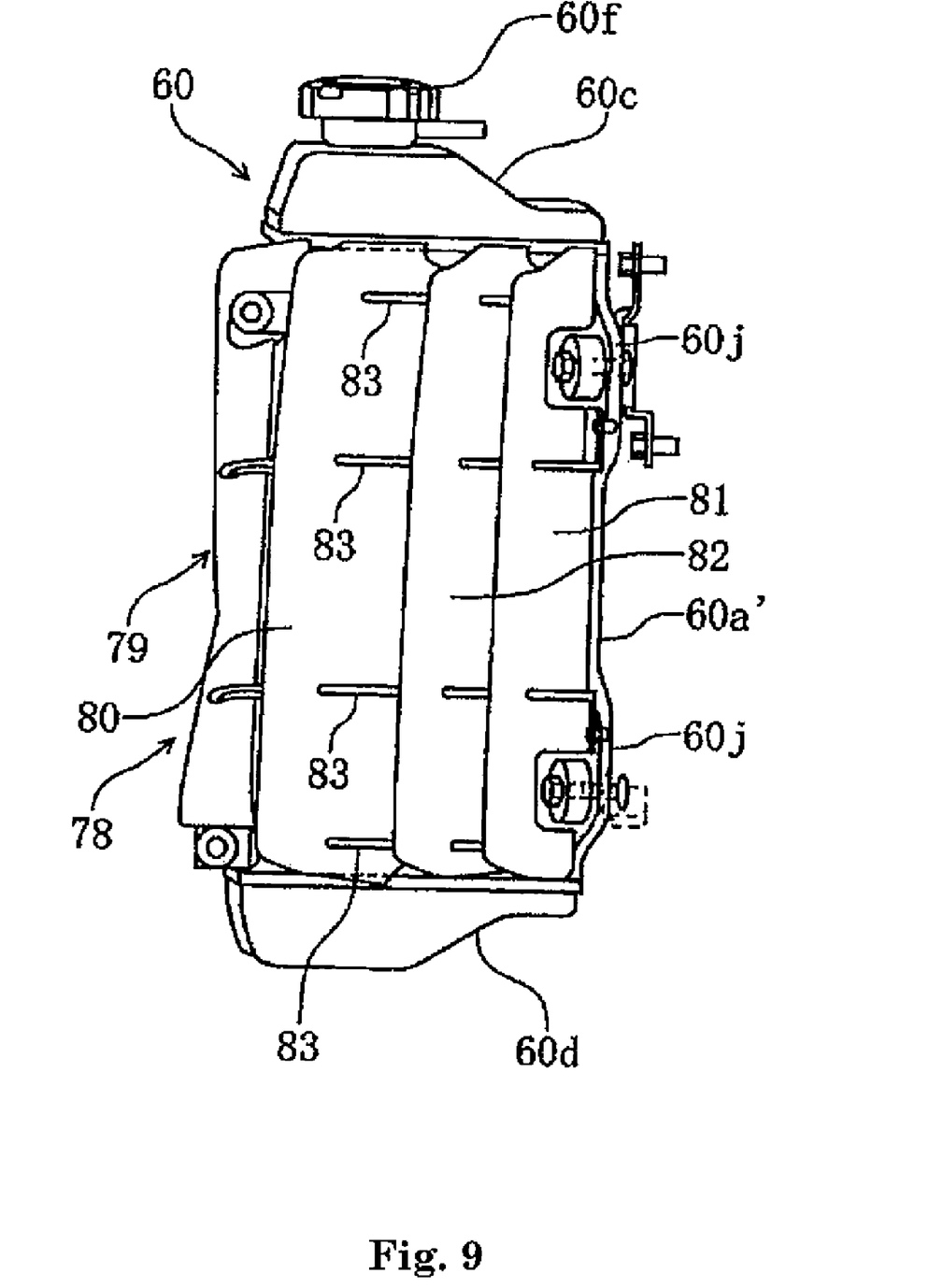
FIG. 9 is a front view of the radiator.

First guide plate 79 extends generally parallel with widened portion 62c of front side cover 62. A side wall 79b extending rearward from a rear edge of first guide plate 79 to cover right sides of radiator 60 and electric fan 60e is formed integrally with first guide plate 79. First guide plate 79 further includes a rear wall 79c and a lower-wall 79d (FIG. 7). Rear wall 79c extends from a rear edge of side wall 79b while being bent inward to cover a rear side of electric fan 60e. Lower wall 79d extends downward from a lower edge of rear wall 79c to cover a bottom rear portion of core 60b. A vertically-elongated opening 79e is defined in side wall 79b.

Side wall 79b, rear wall 79c and lower wall 79d, each extending from first guide plate 79, substantially cover right and rear sides of radiator 60. A right side face of main frame 13 substantially covers left sides of rear wall 79c and lower wall 79d.

In plan view, side wall 79b linearly extends rearward from the rear edge of first guide plate 79 toward front side cover 62, and then extends along front side cover 62 in an inwardly tilted manner. A width of a gap (passage width) between side wall 79b and front side cover 62 in the vehicle width direction becomes narrower toward the rear of the vehicle. A large open space is defined between front side cover 62, and rear wall 79c and lower wall 79d.

Thus, air intake passage 76 for guiding running wind "b" that has entered through air inlet 76a to the rear of radiator 60 is defined by right front side cover 62, first guide plate 79, side wall 79b, rear wall 79c and lower wall 79d.

In plan view, air intake passage 76 has a passage width that is generally uniform in a range from air inlet 76a to a rear end of first guide plate 79 and then gradually narrows from the rear end toward the rear (downstream end) and opens at a position rearward of rear wall 79c.

Radiator 60, first guide plate 79, side wall 79b, rear wall 79c, lower wall 79d, right front side cover 62 and fuel tank 8 define air guide passage 75 for guiding air "a'" that has passed through core 60b upward and downward. Air guide passage 75 has an upward guide passage 75b guiding air "a'" upward and a downward guide passage 75c guiding air "a'" downward.

Rear wall 79c extends inward in the vehicle width direction away from front side cover 62, that is, toward the body frame and fuel tank. Upward guide passage 75b guides a major portion of air "a'" that has passed through radiator 60 upward through a gap between an upper edge 79c' of rear wall 79c and radiator 60.

Figure 12:
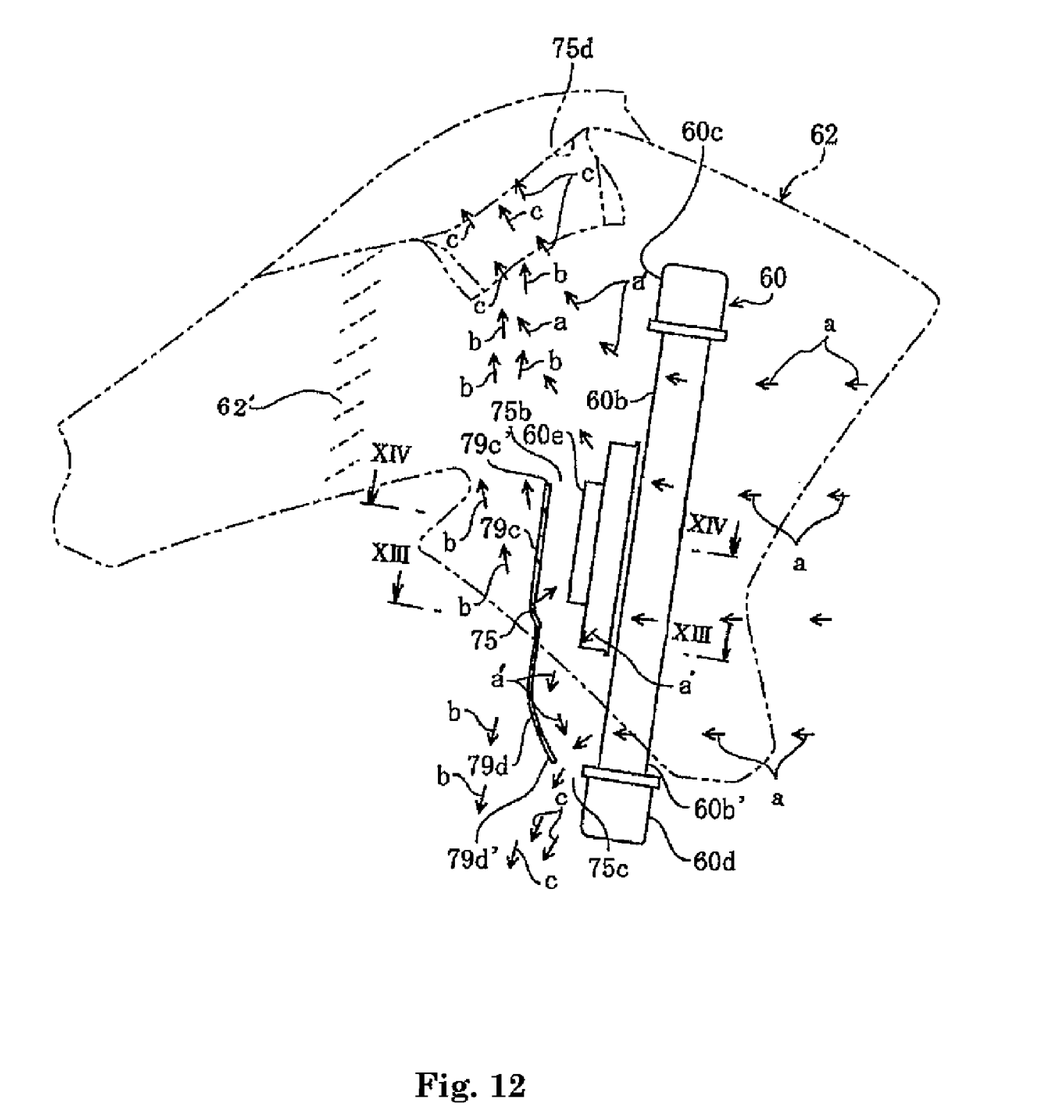
FIG. 12 is a cross-sectional view taken along line XII-XII of FIG. 10, showing flows of running wind around the radiator.

Lower wall 79d curves as it approaches core 60b toward a bottom of lower wall 79d. Downward guide passage 75c guides a portion of running wind "a'" that has passed through radiator 60 downward through a gap between a bottom edge 79d' of lower wall 79d and a bottom edge 60b' of core 60b. An opening width of downward guide passage 75c in the fore-and-aft direction is smaller than an opening width of upward guide passage 75b in the fore-and-aft direction (FIG. 12).

Thus, the major portion of air "a'" that has passed through radiator 60 flows upward through upward guide passage 75b and merges with running wind "b" that has been guided to the rear of rear wall 79c by air intake passage 76, producing a mixed flow "c."

Air guide passage 75 has an air outlet 75d that opens upward in an upper portion of right front side cover 62. Air outlet 75d is situated above upward guide passage 75b to guide mixed flow "c" upward, and is constructed as described below in detail. A region 62' in right front side cover 62 indicated by dashed lines in FIG. 12 is in the proximity of fuel tank 8 and inhibits mixed flow "c" from flowing toward the rear of the vehicle.

Figure 10:
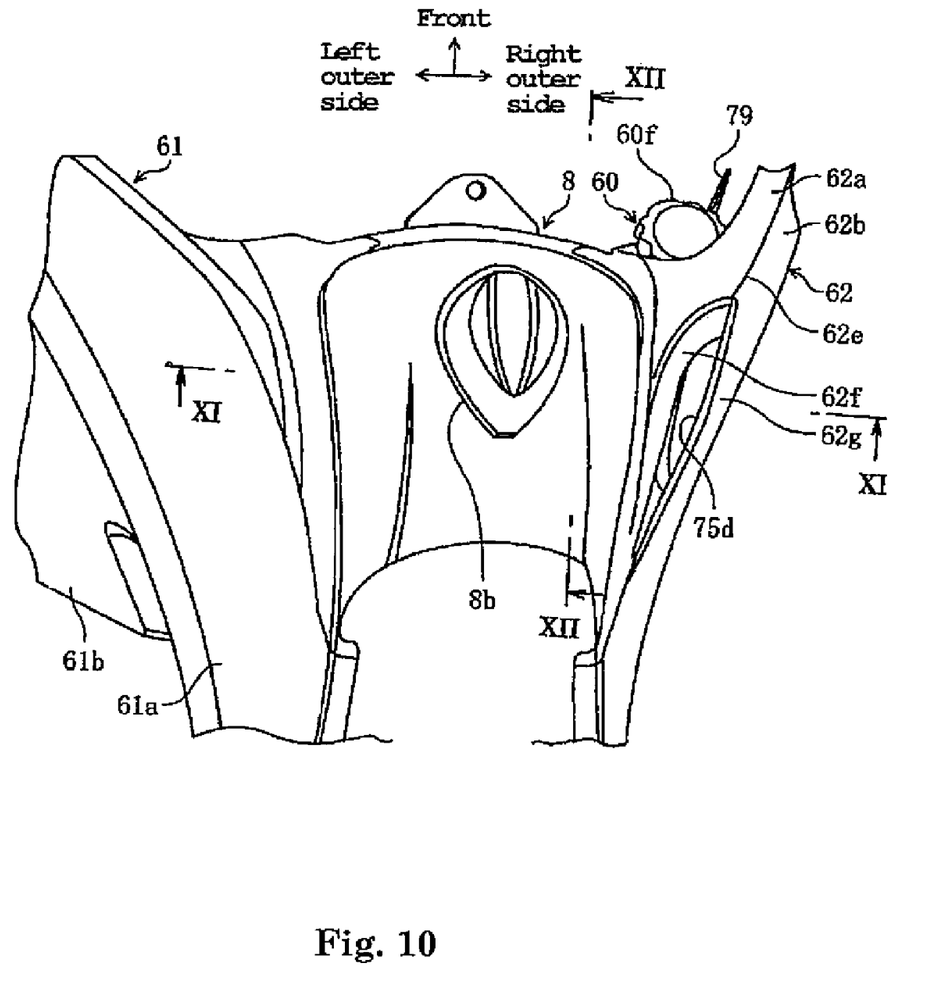
FIG. 10 is a plan view of a fuel tank and a front side cover mounted on the motorcycle.
Figure 11:
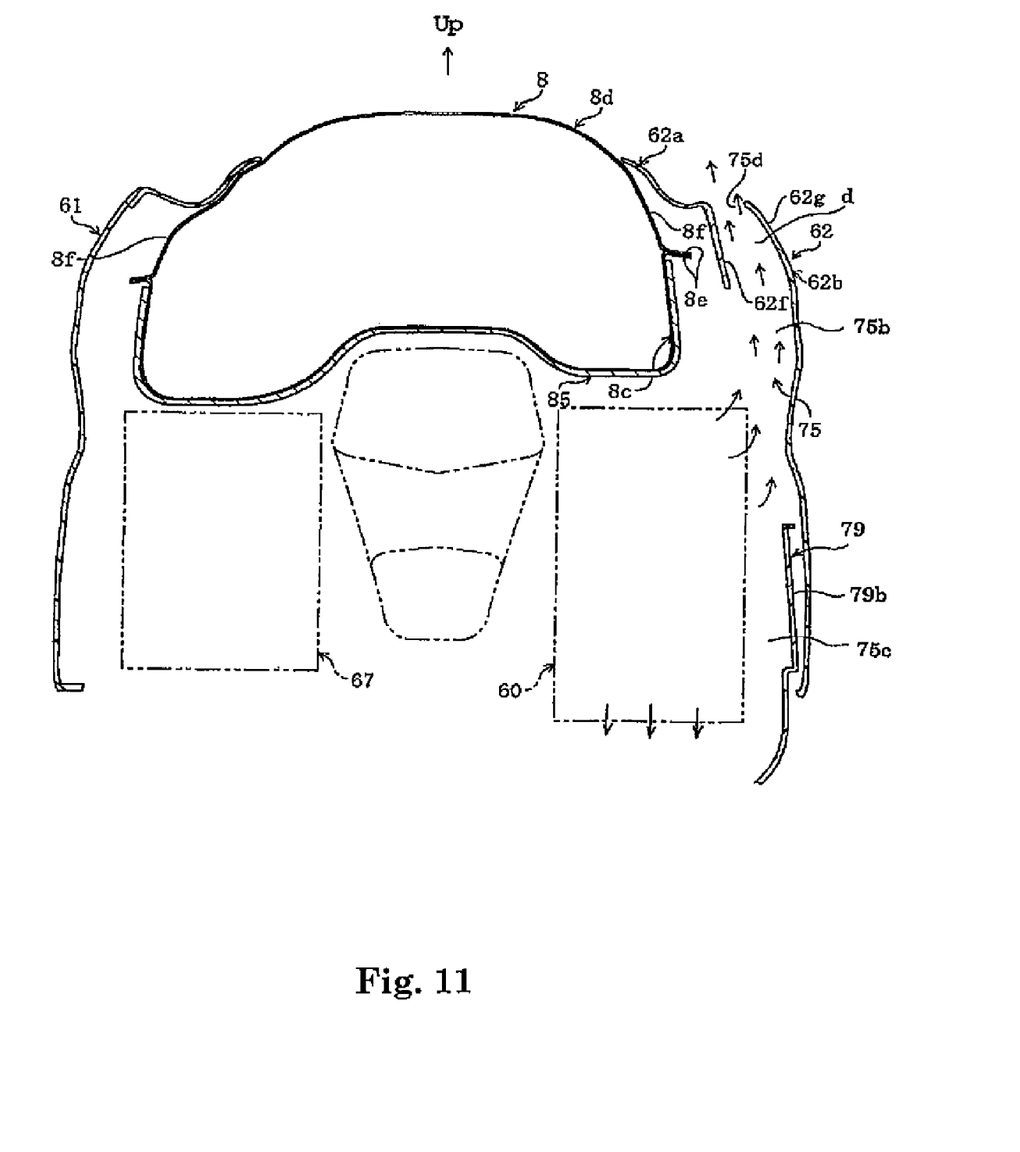
FIG. 11 is a rear cross-sectional view of the fuel tank and the front side cover taken along line XI-XI of FIG. 10.

Right front side cover 62 has a two-piece structure constructed of upper cover 62a and lower cover 62b. A mating surface 62e of upper and lower covers 62a, 62b forms a generally continuous surface. Air outlet 75d is defined between mating surface 62e of upper and lower covers 62a, 62b. Air outlet 75d has a vertically-extending cylindrical shape, and is defined by a first outlet 62f, which is provided by inwardly indenting upper cover 62a so as to come closer to right side wall 8f of fuel tank 8, and a second outlet 62g, which is provided in lower cover 62b by outwardly spacing lower cover 62b from first outlet 62f to create a passage space therebetween (FIGS. 10 and 11). That is, air outlet 75d is defined at an overlap "d," at which first outlet 62f of upper cover 62a and second outlet 62g of lower cover 62b overlap one another in the vehicle width direction.

First outlet 62f covers upper tank 8d, which is a portion of fuel tank 8 above flange (mating line) 8e. A thermal insulating sheet 85 is affixed to lower tank 8c, which is a portion of fuel tank 8 below flange 8e. This structure prevents air "a'" that has passed through radiator 60 from directly impinging on fuel tank 8.

Running wind "a" that has entered from the front of the vehicle flows through gaps between guide plates 79-82 and then passes through core 60b in radiator 60, while running wind "a" simultaneously cools cooling water supplied from engine 3. When air "a'" that has passed through radiator 60 impinges on rear wall 79c and lower wall 79d of first guide plate 79, a major portion of air "a'" flows upward through upward guide passage 75b and then flows out of air outlet 75d in front side cover 62 upward. A portion of air "a'" impinged on rear wall 79c and lower wall 79d flows downward through and out of downward guide passage 75c.

Meanwhile, a portion of running wind "b" that has entered into air intake passage 76 defined by first guide plate 79 and front side cover 62 flows to the rear of rear wall 79c of first guide plate 79 to be merged with air "a." Mixed flow "c," the temperature of which has thus been decreased, flows upward out of air outlet 75d to the outside. Consequently, mixed flow "c" out of air outlet 75d flows rearward through an area higher than a foot of a rider.

According to this embodiment, air guide passage 75 guides air "a'" that has passed through radiator 60 to flow through a gap between right front side cover 62 and fuel tank 8 to an area higher than fuel tank 8. Discomfort that may otherwise be caused by impinging of high temperature air "a'" on a foot of the rider is thereby prevented. Moreover, because a large quantity of running wind flows in the vicinity of an outer surface of fuel tank 8, air coming out of air outlet 75*d* is diluted by the large quantity of running wind. Therefore, air "a'" impinges on the rider after its temperature has been decreased to approximately the same temperature as that of the running wind. Accordingly, air "a'" does not cause any rider discomfort. Furthermore, according to this embodiment, because mixed flow "c," which is a mixture of air "a'" with running wind "b," is upwardly discharged out of air outlet 75*d*, discomfort is even more reliably prevented.

According to this embodiment, because air outlet 75*d* of air guide passage 75 is formed into a cylindrical shape that opens upward in the upper portion of front side cover 62, air "a'" is reliably guided to an area higher than fuel tank 8.

According to this embodiment, because air outlet 75*d* is defined between mating surfaces 62*e* of upper and lower covers 62*a*, 62*b*, air outlet 75*d* is easily provided.

According to this embodiment, air outlet 75*d* is defined by first outlet 62*f*, which is provided by inwardly indenting left-and-right split upper cover 62*a* to bring a portion of upper cover 62*a* in the proximity of fuel tank 8, and second outlet 62*g*, which is provided by situating a portion of lower cover 62*b* outwardly spaced so as to have a passage space between first outlet 62*f* and second outlet 62*g*. Accordingly, air outlet 75*d* having a cylindrical shape is easily defined in front side cover 62. In contrast, defining a cylindrical air outlet without adopting a multi-piece structure requires a complicated resin molding die, resulting in an increase in cost. In addition, because the air outlet is formed into a cylindrical shape, strength and rigidity of the cover per se is ensured, thereby preventing front side cover 62 from being deformed due to knee gripping and the like.

According to this embodiment, first outlet 62*f* covers upper tank 8*d* of fuel tank 8, and thermal insulating sheet 85 is affixed to lower tank 8*c* of fuel tank 8. Accordingly, a rise in temperature of fuel in fuel tank 8 that may otherwise be caused by air "a'" that has passed through radiator 60 is prevented.

In this embodiment, an example in which air guide passage 75 includes upward guide passage 75*b* and downward guide passage 75*c* has been described. However, air guide passage 75 does not necessarily include downward guide passage 75*c*.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A motorcycle comprising:
a body frame;
an engine mounted on the body frame;
a radiator situated forward of the engine;
a fuel tank situated above the engine;
a cover covering side portions of the fuel tank and the radiator; and
an air guide passage arranged between the cover and the fuel tank and to guide air that has passed through the radiator to an area higher than the fuel tank; wherein
an air outlet of the air guide passage is arranged between the cover and the fuel tank in a side view of the motorcycle; and
an entirety of the air outlet overlaps with the fuel tank in the side view of the motorcycle.

2. A motorcycle according to claim 1, wherein the air outlet opens upward in an upper portion of the cover.

3. A motorcycle according to claim 2, wherein the cover has a first cover situated adjacent to the fuel tank and a second cover situated away from the fuel tank, and the air guide passage includes the air outlet situated between the first and second covers.

4. A motorcycle according to claim 3, wherein the air outlet is defined in an overlap between the first and second covers.

5. A motorcycle according to claim 3, wherein the fuel tank has a lower tank joined to an upper tank; and the first cover covers a portion of the upper tank above a mating line on which the upper and lower tanks are joined together.

6. A motorcycle according to claim 5, wherein a thermal insulating sheet is affixed to a portion of the lower tank below the mating line of the fuel tank.

7. A motorcycle according to claim 2, wherein the air outlet is formed into a cylindrical shape.

8. A motorcycle comprising:
a body frame;
an engine mounted on the body frame;
a radiator situated forward of the engine;
a fuel tank situated above the engine;
a cover covering side portions of the fuel tank and the radiator; and
an air guide passage arranged between the cover and the fuel tank and to guide air that has passed through the radiator to an area higher than the fuel tank; wherein
an air outlet of the air guide passage is arranged between the cover and the fuel tank in a side view of the motorcycle; and
the air outlet is arranged above a top of the radiator.

* * * * *